United States Patent [19]

Fratello et al.

[11] Patent Number: 4,965,091
[45] Date of Patent: Oct. 23, 1990

[54] SOL GEL METHOD FOR FORMING THIN LUMINESCENT FILMS

[75] Inventors: Vincent J. Fratello, New Providence; Eliezer M. Rabinovich, Berkeley Heights; Joseph Shmulovich, New Providence, all of N.J.

[73] Assignee: AT&T Bell Laboratories, Murray Hill, N.J.

[21] Appl. No.: 103,986

[22] Filed: Oct. 1, 1987

[51] Int. Cl.$^5$ ............................................. B05D 5/06
[52] U.S. Cl. .................................... 427/64; 427/126.3; 427/226
[58] Field of Search ........................ 427/64, 226, 126.3

[56] References Cited

U.S. PATENT DOCUMENTS 3,816,328  6/1974  Levene ............................. 252/301.65
3,927,224 12/1975  Levene ..................................... 427/64

FOREIGN PATENT DOCUMENTS 0232941  8/1987  European Pat. Off. .
59-138291  8/1984  Japan .

OTHER PUBLICATIONS

*Applied Physics Letters*, vol. 37(5), "Epitaxially grown monocrystalline garnet cathode-ray tube phosphor screens" by J. M. Robertson and M. W. van Tol, pp. 471-472 (1980).
*Physics of Thin Films*, vol. 5, "Oxide Layers Deposited from Organic Solutions" by H. Schroeder, pp. 87-141 (1969).
*J. Non-Crystalline Solids*, vol. 57, "Glassy and Crystalline Systems from Gels: Chemical Basis and Technical Application" by H. Dislich, pp. 371-388 (1983).
*J. Non-Crystalline Solids*, vol. 63, "Glassy and Crystalline Systems from Gels, Chemical Basis and Technical Application" by H. Dislich, pp. 237-241 (1984).
*J. Non-Crystalline Solids*, vol. 82, "Anti-Reflecting Light-Scattering Coatings Via the Sol-Gel-Procedure" by P. Hinz and H. Dislich, pp. 411-416 (1986).
*J. Non-Crystalline Solids*, vol. 63, "Formation of Sheets and Coating Films from Alkoxide Solutions" by S. Sakka, K. Kamiya, K. Makita and Y. Yamamoto, pp. 223-235 (1984).
*American Mineralogist*, vol. 53, "Synthesis and Study of Yttrialite" by J. Ito and H. Johnson, pp. 1940-1953 (1968).

Primary Examiner—Janyce Bell
Attorney, Agent, or Firm—Oleg E. Alber

[57] ABSTRACT

A sol-gel procedure is described for making display devices with luminescent films. The procedure typically involves hydrolysis and polymerization of an organometallic compound together with selected luminescent ions, and coating of a substrate and then heat treatment to form a polycrystalline layer. The procedure is particularly useful for making cathode ray tubes, expecially those for high power operation because of the excellent luminescence characteristics obtained, good thermal contact from the luminescent layer to faceplate and low cost of the procedure. Also described are the devices obtained which exhibit a layer of complex oxide with network structure much like the corresponding bulk compound.

15 Claims, 1 Drawing Sheet

SOL GEL METHOD FOR FORMING THIN LUMINESCENT FILMS

TECHNICAL FIELD

The invention is a device comprising luminescent material and process for making a device comprising luminescent material. In particular, the device is often a display device, such as a cathode ray tube.

BACKGROUND OF THE INVENTION

Display devices, including visual display devices, plan an important part in modern technology and commercial devices available to the public. Typical display devices are cathode ray tubes for use in television sets, tubes used in monitoring devices and tubes used in projection televisions. Also of commercial importance are X-ray imaging devices in which typically X-ray radiation is converted into visible radiation. Phosphors are used to convert various kinds of energy, particularly electromagnetic radiation energy and electron beam energy into radiation in the visible region or radiation region directly adjacent to the visible region such as the infrared region or ultraviolet region.

Cathode ray tubes (CRTs) are especially useful as display devices. They are extensively used in direct view and projection television sets, monitors for computer terminals, television and avionics systems, etc. In many applications (such as projection tubes), high image brightness is required which can only be obtained by the use of a very high power density electron beam. Such high power densities often degrade conventional cathode ray tubes and therefore limit the lifetime of high intensity cathode ray tubes. Even with conventional television tubes extensively used by the public, degradition of the phosphor screen is often apparent.

A significant advance in the development of high intensity cathode ray tubes was the discovery that certain luminescent epitaxial garnet films on single crystal substrates could withstand much higher power densities than with powder phosphors without tube degradation (see, for example, J. M. Robertson et al, *Applied Physics Letters*, 37 (5), pp. 471-472, Sept. 1, 1980). several systems were examined using yttrium aluminum garnet in the epitaxial layers. The activators examined were Tb, Eu, Pr, Tm and Ce. The epitaxial layers were grown by liquid phase epitaxy using a $PbO-B_2O_3$ flux.

Although there are a number of ways to produce these luminescent layers such as chemical vapor deposition, liquid phase epitaxy and sputtering, all are usually expensive and do not adapt well to mass production. It is highly desirable to have a procedure for producing luminescent display devices which are highly efficient, have high resolution and can be mass produced at low cost. Particularly attractive is a procedure for making cathode ray tubes at a cost comparable with presently mass produced cathode ray tube with improved performance including absence or reduced degradation of the phosphor, higher resolution and higher brightness.

The sol-gel procedure is a well-known procedure for making glass and crystalline solids. It is also suitable for the deposition of thin amorphous and crystalline films. The methods of deposition of oxide layers from organic solutions are reviewed by H. Schroeder, "Oxide Layers Deposited from Organic Solutions,"pp. 87-141 in *Physics of Thin Films* 5, edited by G. Hess and R. E. Thun, Academic Press, New York, 1969. A number of other references may also be useful in understanding the invention including H. Dislich, "Glassy and Crystalline Systems from Gels: Chemical Basis and Technical Application," *Journal Non-Crystalline Solids*, 57, 371-88 (1983); H. Dislich, "Glassy and Crystalline Systems from Gels, Chemical Basis and Technical Application," *Journal Non-Crystalline Solids* 63, 237-41 (1984); P. Hinz and H. Dislich, "Anit-Reflecting Light-Scattering Coatings via the Sol-Gel Procedure,"ibid., 82, 411-16 (1986); S. Sakka, K. Kamiya K. Makita, and Y. Yamamoto, "Formation of Sheets and Coating Films from Alkoxide Solutions, " ibid., 63, 223-35 (1984).

Several references describe the of luminescent materials in conjunction with gel processes (e.g., U.S. Pat. No. 3,927,224 issued to Leon Levene on Dec. 16, 1975 and U.S. Pat. No. 3,816,328 issued to Leon Levene on Jun. 11, 1974). These references describe the use of sol gels for incorporation of luminescent material.

SUMMARY OF THE INVENTION

The invention is a process for making a device comprising luminescent material in which the luminescent material comprises complex oxide including at least a first cation and a second cation. The luminescent material is made by a sol-gel procedure designed to form a network of cation-oxygen species which, when heated, forms a glass or crystalline solid with long-range network structure. The inventive procedure involves hydrolysis and polymerization of a compound with at least the first cation together with at least the second cation (or more cations) present in the solution to form an extended inorganic network of cation-oxygen species which on heat treatment forms either an amorphous substance or a crystalline substance. The glass or crystalline solid often corresponds in atomci structure to known bulk luminescent complex oxides but is formed at much lower temperature, at the sight and in the form desired for the particular application (e.g., as a coating on a faceplate of a cathode ray tube) and with sufficient adherence to insure good thermal contact to the substrate. Usually, the glass or crystalline material is in the form of a layer on a substrate often suitable as a display such as a cathode ray tube. The display devices comprise layers of complex oxides with at least two different cation species formed as an extremelyl adherent layer with the fluorescing ion an integral part of the complex oxide layer.

DETAILED DESCRIPTION

Figure 1:
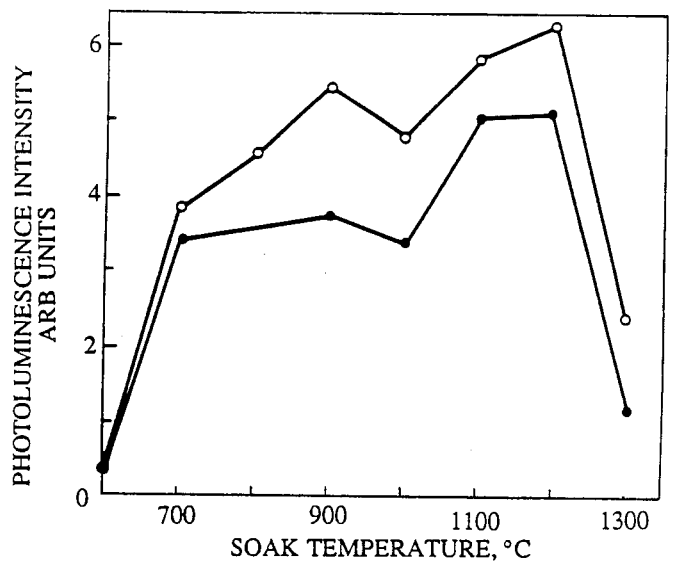
FIG. 1 shows in graph form the photoluminescence output of a $Tb:Y_2SiO_5$ film prepared in accordance with the invention as a function of firing soak temperature.

The invention is based on the discovery that good luminescent complex oxide materials can be made at relatively low temperatures and this luminescent complex oxide material can formed in place as a layer. A complex oxide includes, for example, rare earth doped silicon dioxide (e.g., for example, $SiO_2$ doped with a few mole percent Tb, Eu or Sm) as well as rare earth doped oxides such as $Y_2SiO_5$, $Y_3Al_5O_{12}$, etc. The procedure involves a sol-gel procedure in which an organmetallic compound is hydrolyzed and polymerized, sometimes together with other compounds, to form a polymer network involving two or more different cations including the cations necessary for luminescence. The polymer network is then heated to form a glass or crystalline material.

The complex oxide formed has the same luminescent properties of the corresponding bulk complex oxide made by conventional means such as melting the corresponding oxides. The advantage of the procedure is the ease of making thin complex oxide layers formed in place, uniformity of the product and low temperature needed to form the complex oxide.

Two different cations are necessary to form the luminescent material. One cation is introduced using the compound which undergoes polymerization on hydrolysis. Generally, this is an organometallic compound which when hydrolyzed undergoes polymerization. Typical examples are the silicon alkoxides. Tetraethyl orthosilicate is preferred because of availability and low cost. Other cations and their alkoxides may also be used including those of aluminum, titanium, germanium, and tungsten.

A second cation is introduced either in the form of a compound that polymerizes after or simultaneously with hydrolysis (much like the first cation) or in the form of a soluble species that is incorporated into the hydrolysis and polymerization of the first cation. The species is typically soluble in water, alcohol or acid. Although the luminescent ion can be a substituent for either the first or second cation, usually it involves the second ion. Typical second cations are the rare earth ions (atomic numbers 57-71) including lanthanum and lutetium as well as yttrium. Other typical ions useful as second cations are the transitionmetal ions including titanium, vanadium, chromium, manganese and zinc.

Typically, the compound containing the first cation (generally a metal alkoxide) is dissolved in a solvent and mixed with a solution of a compound of the second cation so as to form a uniform sol comprising the two or more cations. At least one (i.e., the first cation) of the cation compounds must be capable of polymerization on hydrolysis. The second cation compound may also be capable of polymerization on hydrolysis (e.g., be a metal alkoxide) or may be a soluble salt such as a nitrate, chloride, bromide, iodide, sulfate, etc. Water is present in one of the solutions. Conditions of the solution (e.g., pH) are such as to insure hydrolysis and polymerization. The sol may be used to coat substrates or other surfaces or used as is to form the bulk luminescent oxide. In coating substrates, multiple coating may be produced by alternately coating the substrate with the sol and drying in air at room temperature or with the application of heat. It is believed that in this initial phase of the preparation procedure hydrolysis and polymerization leads to the formation of a continuous cation-oxygen network much as is found in high silica glasses.

The resulting material is then heat treated to form the luminescent substance. Heat treatment may involve formation of a glass or one or more crystalline phases. This heat treatment, generally in the temperature range from about 800° C. to 1500° C., is carried out so as to maximize the luminescence. The resulting luminescence can often be predicted from the characteristics of the bulk material made by conventional procedures. The invention may be better understood by the description of the preparation procedure for a specific example. It is well known that certain rare earth doped yttrium orr- thosilicate material have excellent luminescent properties. For example, terbium activated yttrium orthosilicate is an excellent green phosphor.

Tetraethyl orthosilicate (TEOS) is conveniently used as the source of silicon and as the compound which ungoes hydrolysis and polymerization. The source of yttrium and terbium are yttrium nitrate and terbium nitrate. A composition known to yield good luminescent properties is 46 mol percent $Y_2O_3$, 4 mol percent $Tb_2O_3$ and 50 mol percent $SiO_2$.

One mole of TEOS is dissolved in 4 moles of ethyl alcohol. The yttrium nitrate and terbium nitrate are dissolved in water with pH adjusted to about one by the addition of HCl. Additional water is often used to retard gelation and yield thinner, more uniform coatings. The two solutions are mixed together usually at room temperature but cooling may be used. The HCl used for pH adjustment may be replaced by other acids. In particular, $H_3BO_3$ may be used so that on firing, the $B_2O_3$ formed provides better adhesion of the film to the substrate.

Prepared solutions are deposited on fused silica and sapphire discs 1.85 cm and 2.54 cm in diameter. Before deposition the specimens are thoroughly cleaned. They are washed in a hot (70° C.) Alconox ® deionized water solution in an ultrasonic bath, rinsed in deionized water and blow-dried with nitrogen. After that, the sapphire discs are etched in a mixture of concentrated $H_3BO_4$ and $H_2SO_4$ at 180° C. for 1 minute, rinsed with water (in the ultrasonic bath) and blow-dried with $N_2$. The fused silica samples are etched in a buffered HF solution for 30 seconds, rinsed and dried with $N_2$.

The films are deposited using dip coating by manual submersion of the discs into a narrow rectangular quartz cuvette filled with the solution. The discs are withdrawn with a speed of about 0.5 cm/sec and dried and gelled in air. The dried films are fired in a tube furnace in air. Firing at 600° C. resulted in the formation of a dense amorphous film with good uniformity. After such a low-temperature firing, the second layer could be deposited, and so on; typically up to 6 layers. A first dipping in the solution resulting in a thickness of about 0.35 $\mu m$; 2 layers coatings could be 1 $\mu m$ thick. An analysis of the composition of the film fired at 600° C. was done using Rutherford Backscattering (RBS) and showed about the composition expected.

The formatoin of crystal phases and development of light emissions were studied on a series of fused silica and sapphire samples coated with 2 layers of solution. The samples, preheated at 600° C., were then heated at the rate of 400° C./hr up to the desired temperature, soaked at this temperature for 2 hrs. and quenched in room air.

Structural, spectral and luminescent properties of the films were studied as a function of the soaking temperatures. Cathodoluminescence measurements were performed on the films in a modified SEM apparatus described elsewhere. Samples were excited in a 525 line raster mode (2:1 interlaced), where the raster area was typically 0.2×0.3 cm. Because of the scattering nature of the films, spot brightness rather than the total light output was monitored. A Gamma Scientific Micropho- tometer Model 700-10 C with 2.5 X objective was used to make the measurements. The photoexcitation and photoluminescence spectra were taken with a Perkin-Elmer MPF-4 fluorescence spectrophotometer. The total light output from the films was examined upon excitation by a broad band mercury lamp. The light output was measured using a Minolta "Luminance meter 1° C.". The relative positions of the lamp, sample and the photometer were constant in all measurements. To eliminate possible contributions from adjacent areas through light guiding in the substrate, only the measured area was exposed. Results of the measurements were normalized to the light output of a reference crystal measured at the same time. A UV blocking filter (Corning 3-80) was placed between the sample and the photometer. The phase compositions of the films were determined using a Philips APD3600 X-ray powder diffractometer. The surface morphology was studied in an Amray 1200 B SEM.

No crystalline phase was observed after 2 hr. soakings at 600° C., 700° C. and 800° C. Starting at 900° C., a first crystal phase appeared which is gradually replaced by another phase starting at 1200° C.; this second phase reaches full development at 1300° C. At 1400° C., the film reacts with the substrate. Comparison of the XRD patterns of the first 2 phases with standards clearly shows that the both are practically pure yttrium orthosilicates, yet of different crystal structure. The initial crystallization of the amorphous films results in the formation of a low-temperature $X_1$ film of $Y_2SiO_5$ which, starting from 1200° C., begins to transfrom to the high-temperature $X_2$ phase. (See for example, J Ito and H. Johnson, *Synthesis and Study of Yttrialite, American Mineralogist* 53, 1940 (1968). There are practically no other crystal phases up to 1400° C. This fact, together with the results of RBS analysis, indicates that formation of a network of amorphous $Tb:Y_2SiO_5$ was achieved in a sol at room temperature and during low-temperature firings (below 900° C.).

The heat treated films were evaluated for photoluminescence and cathodoluminescence performance after every firing step. Typical results are shown in FIG. 1. Here, the photoluminescence output of a sample is shown as a function of firing or soak temperature. As seen from FIG. 1, the light output increases with the temperature up to 1200° C., but at 1300° C. a sharp decrease in luminescence is observed. Following the crystalline phase development reflected by the XRD results this drop in light output can be correlated with the full development of the $X_2$ phase. Although this descrease in photoluminescence is not completely understood, apparently the $X_2$ phase has a lower photoexcitation efficiency.

Figure 2:
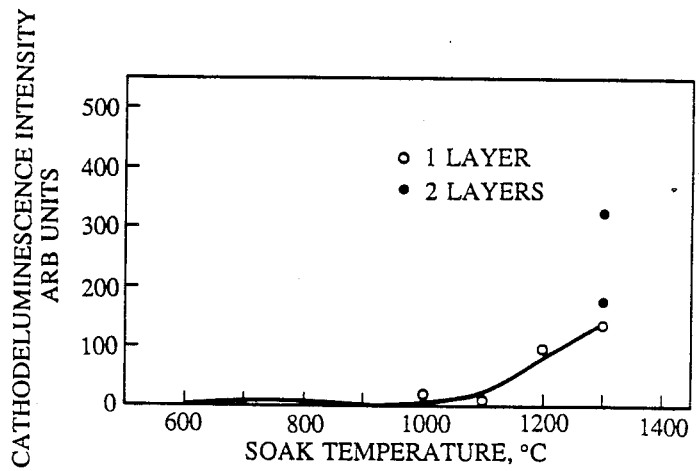
FIG. 2 shows in graph form the cathodoluminescence output of a $Tb:Y_2SiO_5$ film prepared in accordance with the invention as a function of firing soak temperature.

The development of the cathodoluminescence intensity as a function of the firing temperature is presented in FIG. 2. The onset of cathodoluminescence coincides with the appearance of the $X_2$ phase. The best result is obtained at approximately 1300° C., which is contradictory to the behavior of the photoluminescence intensity. It was essential to increase the film thickness above the electron beam penetration range (about $\sim 0.5$ $\mu$m for 10 kV electrons) to assure complete absorption of the electron beam energy in the film and FIG. 2 shows increase in the intensity for a two layer coating compared to only one layer. The total light output from the best two layer film is equal to that from a single crystal of $Tb^{3+}:Y_2SiO_5$ excited at the same conditions. However, considering the scattering nature of the sol-gel films, their external efficiency should be twice as high as that of the single crystal phosphor, if the internal conversion efficiency is the same in both materials. From these considerations we estimate that the internal conversion efficiency in the best films reaches $\sim 40\%$ of that of the single crystal.

A variety of devices can be made using the process described above. The devices comprise luminescent material often used to convert various types of radiation into visible radiation. A typical device is an X-ray imaging device.

Particularlly important commercially is the cathode ray tube (CRT). Such tubes are used in conventional television sets, various kinds of monitors as for example for computer terminals, for graphics of various kinds and for various projection-type television devices.

Figure 3:
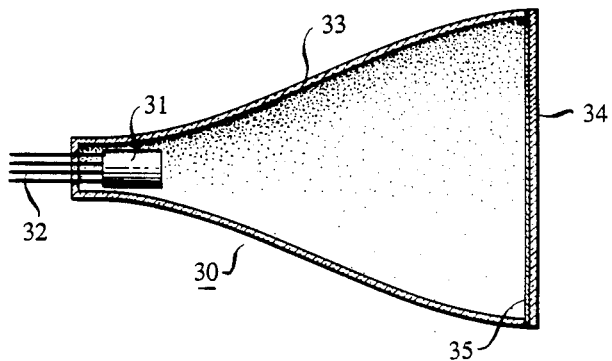
FIG. 3 shows a cross-sectional diagram of a cathode ray tube with luminescent material on the inside face of the faceplate.

A typical cathode ray tube is shown in FIG. 3. The cathode ray tube 30 is made up of an electron radiation source, 31, with means for electrical connection to outside source of electrical signal 32, an enclosure usually made of glass 33 and screen 34. Generally, means is provided for deflecting a beam of electrons and varying the amplitude of the electron beam. The luminescent material is usually deposited on the inside face 35 of the faceplate. An advantage of these CRT devices is that the faceplate can be made of a relatively low index of refraction material (e.g., glass) so that light trapping does not reduce the output efficiency of the luminescent material.

An advantageous feature of the invention is that the luminescent properties of the material made by the sol-gel procedure is approximately the same as for the bulk material made by conventional means. A listing of the luminescent properties of several activation ions for yttrium orthosilicate is helpful in predicting the luminescent characteristics of materials and films made by the inventive procedure. It should be remarked that rare earth activated $Y_2SiO_5$ often produces extremely good luminescent materials both from the standpoint of efficiency and color.

A number of typical luminescent materials are given below:

1. Gadolinium doped yttrium orthosilicate with preferred concentration range between about 0.3 and 25.0 mole percent and most preferred concentration range between 0.5 and 5.0 mole percent. This phosphor emits a very narrow, (3-4 nm) strong line in the UV (317 nm) which is useful for a variety of applications including energy transfer in phosphors and as a UV source for exposing photoresist in integrated circuit fabrication.

2. Terbium doped $Y_2SiO_5$ with preferred concentration range of 1.0 to 15.0 mole percent and a most preferred range of 4.0 and 10.0 mole percent. This phosphor emits at about 550 nm (green) and also has an extremely strong phosphorescence output.

3. Gadolinium and terbium doped yttrium orthosilicate. This phosphor emits in the green region and is slightly more efficient than terbium alone. Preferred concentration range is 5.0 to 15.0 mole percent for terbium and 0.1 to 10.0 mole percent for gadolinium with 5.0 to 10.0 mole percent most preferred for terbium and 2.5 to 7.5 mole percent most preferred for gadolinium.

4. Cerium doped yttrium orthosilicate with preferred concentration range from 0.05 to 1.5 mole percent with 0.1 to 1.0 mole percent most preferred. This phosphor emits strongly in the blue under electron excitation. It is approximately 10 times brighter than the best blue garnet phosphor known.

5. Cerium and terbuim doped yttrium orthosilicate with preferred concentrations between 0.1 to 1.0 mole percent for cerium and 5.0 and 15.0 mole percent for terbuim. This phosphor emits light in the green with essentially no blue emission. It is an ideal phosphor for a television tube. Most preferred concentrations are from 0.12 to 1.0 mole percent cerium and 5.0 to 10.0 mole percent terbuim.

6. Gadolinium and cerium doped yttrium orthosilicate. This phosphor emits in the blue part of the visible spectrum and the presence of gadolinium considerably increases the output of the phosphorescence. Preferred concentrations are 0.1 and 0.5 mole percent cerium, 0.1 to 20.0 mole percent gadolinium with 0.1 to 0.35 mole percent cerium and 0.5 to 5.0 mole percent gadolinium most preferred.

7. Europium and terbium doped yttrium orthosilicate. This phosphor emits strongly in the red without significant green output and is useful for monitor CRTs as well as color television tubes. Preferred concentrations are 5.0 to 7.5 mole percent terbium and 0.1 to 15.0 mole percent europium with 1.0 to 3.5 mole percent terbium and 5.0 to 10.0 mole percent europium most preferred.

What is claimed is:

1. A method for fabricting a device, comprising the steps of:
   forming a complex oxide capable of luminescing when impinged by energy, said complex oxide including at least first and second cations, said first cation being selected from the group consisting of silicon and aluminum, and said second cation being selected from the group consisting of rare earth elements with atomic number 57–71 and yttrium; and
   completing the fabrication of said device, said completing step including the step of incorporating a substrate coated with said complex oxide into said device, characterized in that
   said forming step includes the steps of
      (a) dissolving in an aqueous solution salts comprising at least one second cation element, said salts being selected from the group consisting of nitrate, chloride, bromide, iodide, and sulfate,
      (b) mixing said salts solution with a metal alkoxide containing said first cation to promote hydrolysis of said alkoxide with formation of a sol capable of gellation to provide a sol. . . (c) applying a coating of said sol to a substrate and (d) heat treating the coated substrated in a temperature range of about 800° C. to 1500° C.

2. The method of claim 1 in which the metal alkoxide is silicon alkoxide.

3. The method of claim 1 in which the metal alkoxide is tetraethylorthosilicate.

4. The method of claim 1 in which the said at least one second cation is yttrium.

5. The method of claim 1 in which at least one of said at least one second cations is selected from the group consisting of rare earth elements with atomic numbers 57–71.

6. The method of claim 1 in which the metal alkoxide is tetraethylorthosilicate, one of the said at least one second cation is yttrium and another one of said at least one second cations is selected from the group of rare earth elements with atomic number 57–71, the latter is added to provide luminescence.

7. The method of claim 6 in which said at least one another of said second cations is terbium.

8. The method of claim 7 in which the forming step includes
   a. dissolving the tetraethylorthosilicate in ethyl alchol to form a tetraethylorthosilicate solution;
   b. dissolving yttrium nitrate and terbium nitrate in acidified water to form a yttrium-terbium solution;
   c. mixing the tetraethylorthosilicate solution and yttrium-terbium solution together to form a coating solution;
   d. coating a substrate with the coating solution; and
   e. heat treating the coated substrate to form a luminescent complex oxide layer in the temperature range from about 800° C. to 1500° C.

9. The method of claim 8 in which the heat treatment comprises heating the coated substrate to at least 900° C.

10. The method of claim 9 in which the coated substrate is heated to approximately 1300° C.

11. The method of claim 1 in which the device comprises a cathode ray tube.

12. A method for fabricating a device incorporating a complex oxide capable of liminescing when impinged by energy, which comprises the steps of
   forming complex oxide including at least a first and second cations, and
   completing the fabrication of the device by steps including incorporation of a substrate coated with the complex oxide into the device, wherein
   said forming step includes combining in an aqueous solution water-soluble salts comprising at least one second cation element and a metal alkoxide containing said first cation so as to promote hydrolysis of said alkoxide with formation of a sol capable of gellation,
   said first cation being selected from the group consisting of silicon and aluminum, said at least one second cation being selected from the group consisting of rare earth elements with atomic number 57–71 and yttrium, and said salt being selected from the group consisting of nitrate, chloride, bromide, iodide and sulfate applying a coating of said sol to a substrate and heat treating the coated substrate in the temperature range of about 800° C. to 1500° C.

13. The method of claim 12, in which said metal alkoxide is tetraethylorthosilicate, the said at least one second cation is yttrium and at least one of said rare earth elements.

14. The method of claim 13 in which said second cation salts are yttrium nitrate and a water-soluble salt of said at least one rare earth element.

15. The method of claim 14 in which said at least one rare earth element is terbium and said water soluble salt is terbium nitrate.

* * * * *